(No Model.)

J. HENDERSON.
HOG TRAP.

No. 387,301.  Patented Aug. 7, 1888.

Witnesses:
R. H. Orwig,
M. P. Smith

Inventor:
John Henderson,
By Thomas G. Orwig, Atty.

UNITED STATES PATENT OFFICE.

JOHN HENDERSON, OF FONTANELLE, IOWA.

HOG-TRAP.

SPECIFICATION forming part of Letters Patent No. 387,301, dated August 7, 1888.

Application filed May 21, 1888. Serial No. 274,617. (No model.)

*To all whom it may concern:*

Be it known that I, JOHN HENDERSON, a citizen of the United States of America, and a resident of Fontanelle, in the county of Adair and State of Iowa, have invented an Improved Hog-Trap, of which the following is a specification.

My object is to facilitate the catching and holding of hogs as required to put rings in their noses to prevent them from rooting; and my invention consists in the construction and combination of a pivoted platform, two gates, a hand-lever, and a gate-fastening device, with a portable cage or fixed chute, as hereinafter set forth, in such a manner that when a hog enters to pass through and advances over the center of the pivoted floor or platform the platform will be tilted and the entrance practically closed to prevent the hog from moving backward, and the head of the animal lowered to an opening that will admit the head to pass through (but not the body) to be fastened by means of the hinged gates and pivoted lever.

Figure 1:
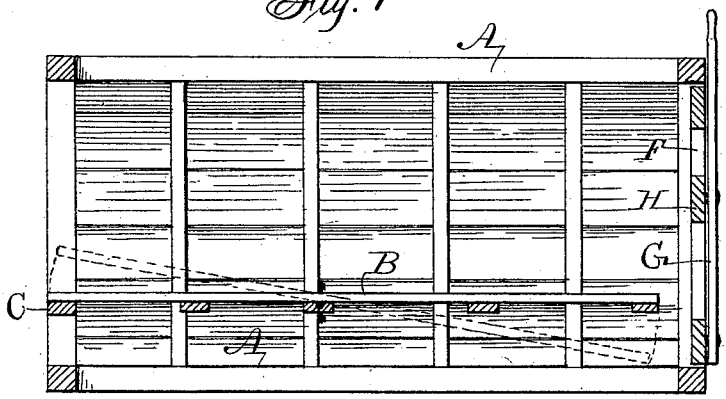
Figure 2:
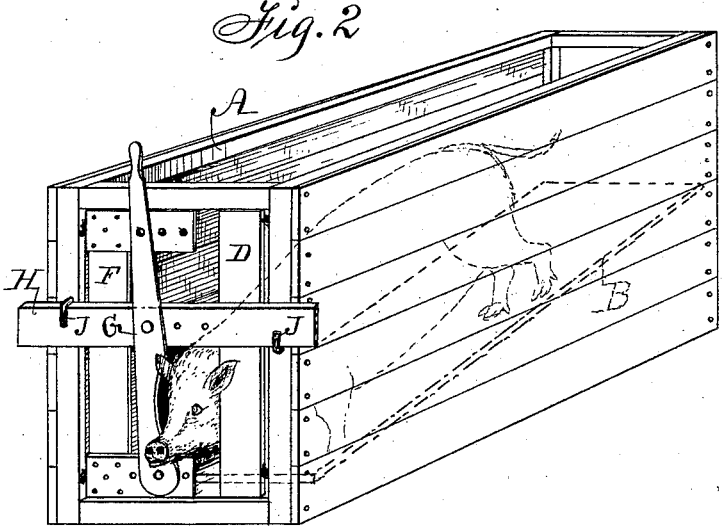

Figure 1 of the accompanying drawings is a vertical longitudinal sectional view showing the trap in readiness for the admission of a hog. Fig. 2 is a perspective view showing a hog caught and the animal's head projected outside of the trap and held fast as required to facilitate placing a ring in the nose.

A represents an open-ended box or chute adapted to be placed in such a position relative to a hog-pen or field-fence that hogs in the inclosure can be successively driven into the open end of the trap.

B is a platform that extends from one end of the trap to the other, and is pivoted at its center at some elevation relative to the sides of the box in such a manner that when a hog steps into the trap when the platform is level and advances over the center to pass through the open space visible at the opposite end the platform will tilt and prevent the hog from retreating, while the nose and head of the animal are lowered relative to the large open space above the plane over which the hog entered and advanced when the platform was level.

C is a cross-piece fixed to the ends of the parallel sides of the box A, to prevent the platform from descending when a hog enters.

D represents a narrow gate hinged to one of the sides at the open end of the box.

F is a frame or gate hinged to the opposite side of the same end of the box in such a manner that the two gates will swing outward.

G is a lever adjustably connected with the horizontal bar at the bottom of the frame or gate F.

H is a cross-bar pivoted to the central portion of the lever to engage hooks J, fixed to the opposite sides of the box in such a manner that when the bar H is in a horizontal position it will engage both of the hooks and prevent both of the gates D and F from opening. Perforations in the bar at the top of the frame or gate F allow a pin to be inserted to fasten the top end of the lever as required to clamp a hog fast between the lever and the edge of the gate D.

In the practical use of my invention thus constructed, when a hog enters and is caught and projects his head through the opening that occurs under the pivoted bar H, and between the lever G and gate D, I press the top end and long arm of the lever against the hog's neck and then fasten the lever, and thereby fasten the hog in such a manner that a ring can be readily inserted in the cartilage of the snout. To release the hog, I loosen the lever and free the bar H from the hooks J, and allow the two gates to swing outward and the hog to run away. Any number of hogs in an inclosure can be thus in succession trapped and held and rings fixed in their noses without incurring the labor incident to catching and holding hogs by hand.

By opening or removing the gates the box or chute and pivoted floor may be connected with a wagon for loading and unloading hogs.

I claim as my invention—

1. A trap for catching and holding hogs, comprising a box, frame, or chute having open ends, a floor or platform pivoted to the sides and central portion of said box, two hinged gates, a lever pivoted to the lower portion of one of the gates, a cross-bar pivoted to the lever, and hooks fixed to the ends of the sides of the box to engage the cross-bar, arranged and combined to operate in the manner set forth.

2. The box A, having a fixed cross-piece, C, the pivoted platform B, the gates D and F, the lever G, the cross-bar H, and the fixed hooks J, constructed and combined substantially as shown and described, for the purposes stated.

JOHN HENDERSON.

Witnesses:
WILLIAM MORLEY,
J. R. EARNEST.